Figure 1:
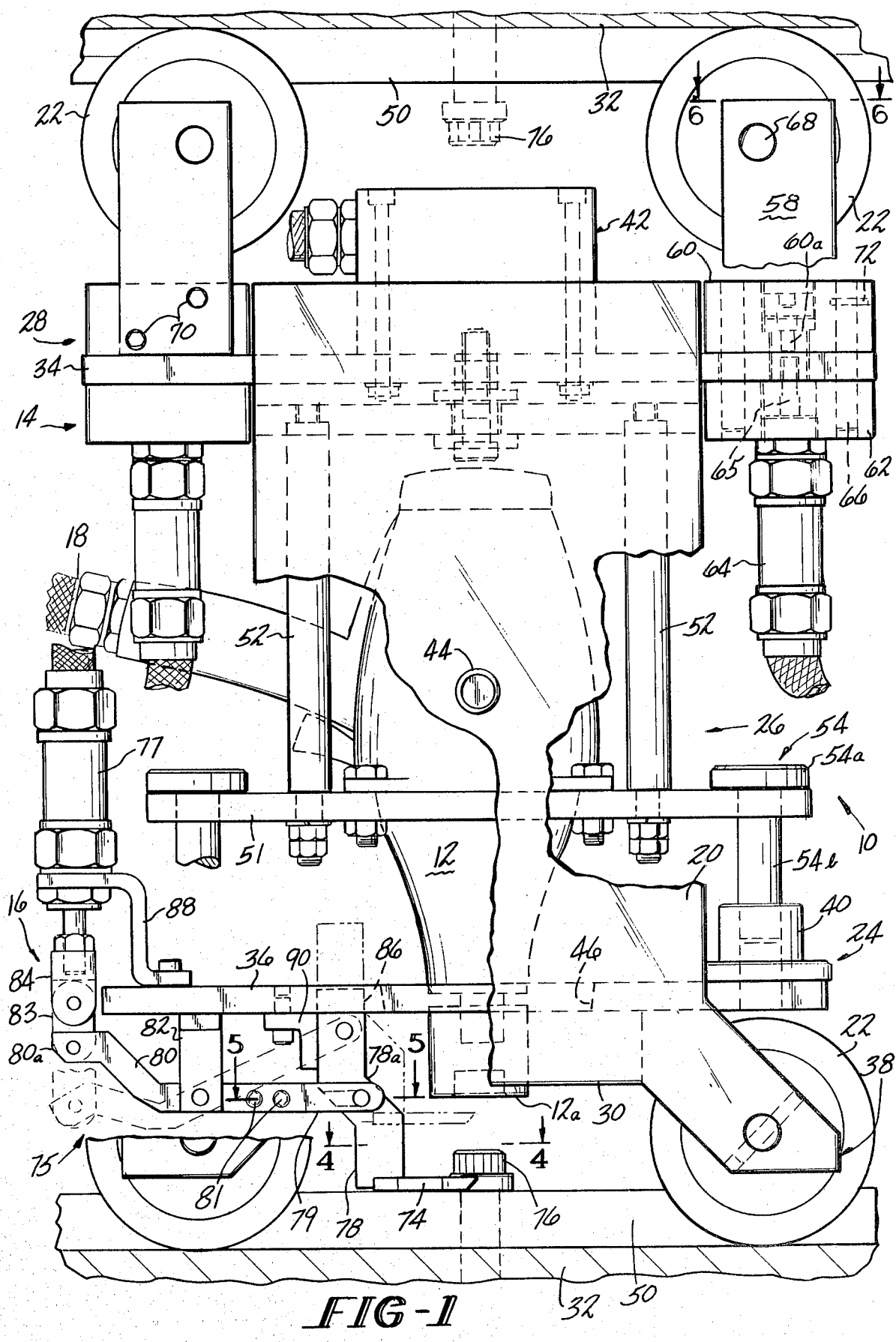

United States Patent [19]

Specht et al.

[11] 4,297,923
[45] Nov. 3, 1981

[54] AUTOMATIC TIGHTENER/LOOSENER FOR INTERCELL ELECTRICAL CONNECTORS

[75] Inventors: Steven J. Specht, Mentor, Ohio; Morton S. Kircher, Clearwater, Fla.

[73] Assignee: Olin Corporation, New Haven, Conn.

[21] Appl. No.: 93,425

[22] Filed: Nov. 13, 1976

[51] Int. Cl.³ ............................................. B25B 21/02
[52] U.S. Cl. ................................. 81/57.41; 81/57.25; 81/451; 29/240; 29/730
[58] Field of Search ...................... 29/730, 623.1, 240; 81/57.25, 57.41, 57.40, 57.24, 451, 456; 173/22, 34

[56] References Cited

U.S. PATENT DOCUMENTS

| 337,968 | 3/1886 | Manning | 173/22 |
|---|---|---|---|
| 1,093,848 | 4/1914 | Harbot | 81/57.25 |
| 1,807,367 | 5/1931 | Woolery | 81/57.25 |
| 2,021,170 | 11/1935 | Bronander | 81/57.25 |
| 2,645,964 | 7/1953 | Kochaver | 81/57.41 |
| 2,898,792 | 8/1959 | Fox et al. | 81/57.41 |
| 3,017,794 | 1/1962 | Pouget | 81/57.41 |
| 3,432,422 | 3/1969 | Currey | 204/258 |
| 3,730,237 | 5/1973 | Hanzlik | 81/456 |
| 3,783,122 | 1/1974 | Sato et al. | 204/279 |
| 3,859,196 | 1/1975 | Ruthel et al. | 204/278 |
| 3,930,978 | 1/1976 | Strewe et al. | 204/267 |

FOREIGN PATENT DOCUMENTS 1087539 8/1960 Fed. Rep. of Germany ..... 81/57.24

Primary Examiner—Daniel C. Crane
Attorney, Agent, or Firm—Thomas P. O'Day; Donald F. Clements; Ralph D'Alessandro

[57] ABSTRACT

A remotely-controlled tightener for selectively tightening and loosening electrical connectors between electrolytic cells.

14 Claims, 7 Drawing Figures

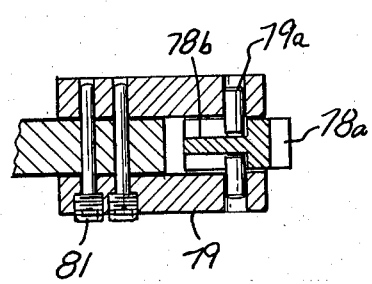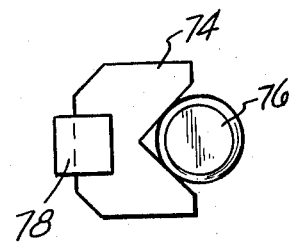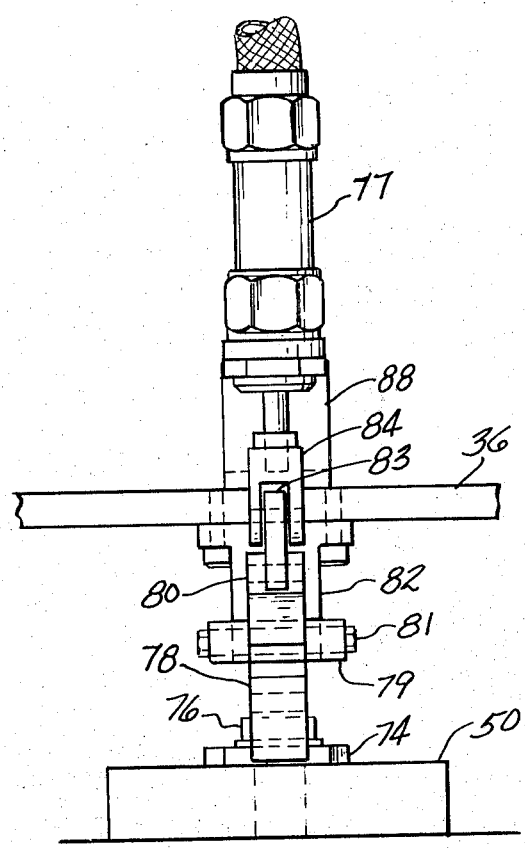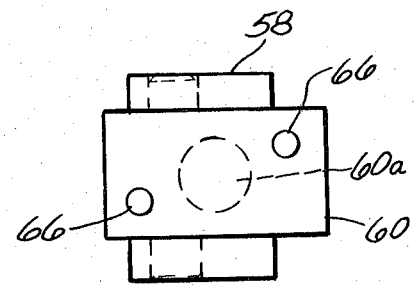

AUTOMATIC TIGHTENER/LOOSENER FOR INTERCELL ELECTRICAL CONNECTORS

The present invention relates to apparatus for loosening and tightening an electrical connector between electrolytic cells.

The conventional mechanism for loosening and tightening electrical connectors between electrolytic cells is to manually apply a wrench to bolts holding such electrical connectors to the cell terminals of the cells from which the electrical connector is to be loosened or tightened. However, in order to conserve materials and energy, it is desirable to place electrolytic cells sufficiently close together that manual loosening and tightening of electrical connectors between such cells is made increasingly difficult. Various methods have, in the past, been proposed for solving this problem. One such method is to add additional metal to the cell terminals so that the cell terminals are brought laterally forward into an aisle along such cells and then disconnecting the cells from one another in that aisle by manual means. One example of such a method is disclosed in U.S. Pat. No. 3,783,122, by Sato et al issued Jan. 1, 1974.

An alternate method previously proposed is that which is disclosed in U.S. Pat. No. 3,930,978, by Strewe et al issued Jan. 6, 1976. The Strewe et al patent discloses elevating the electrolytic cell so that access can be had to the intercell connectors from below the level of the electrolytic cell. However, this is quite expensive in that it requires an extra floor in the cell plant and requires construction of a substantial cell support framework system to hold the electrolytic cells in such an elevated position.

There is a need for an apparatus which can loosen and tighten electrical connectors between cells without requiring manual operations between such cells. There is need for a remote-controlled apparatus not only from this safety standpoint but from a material and energy conservation standpoint as well, since it is a current problem in the art that the connections between cells presently requires so much extra conductor metal or a complex cell plant designed to elevate the cells for access from below.

The present invention solves these problems by providing an apparatus for loosening and tightening an electrical connector between electrolytic cells, which apparatus comprises:

(a) remotely operably tightener means for selectively tightening and loosening said electrical connector;

(b) moveable support means for supporting said tightener means;

(c) guide means for guiding said support means along a predetermined path of travel between said cells, said path including at least one predetermined location at which said tightener means is operable to loosen and tighten said connector;

(d) locator means for locating said support means at a predetermined location along said path; and (e) control means for remotely controlling the operation of said tightener means when said tightener means is located at said predetermined location, whereby said electrical connector is selectively tightened and loosened.

The remotely-controlled tightener and loosener of the invention can preferably be expanded to hold the tightener in position and preferably includes a two-position actuator for moving the tightener into and out of engagement with fastener means on the electrical connector. The apparatus of the invention preferably also includes a means for locating the fasteners of the electrical connector and preferably has wheels to guide the tightener along the electrical connector to the proper location. The device is preferably rotatable to an inverted position so that it can tighten and loosen two separate, vertically aligned electrical connectors with a minimum of movement. The apparatus of the invention also preferably includes a cart on which the support means is held between operations at the same vertical height as the height of the path along which the apparatus moves during tightening and loosening operations.

Figure 2:
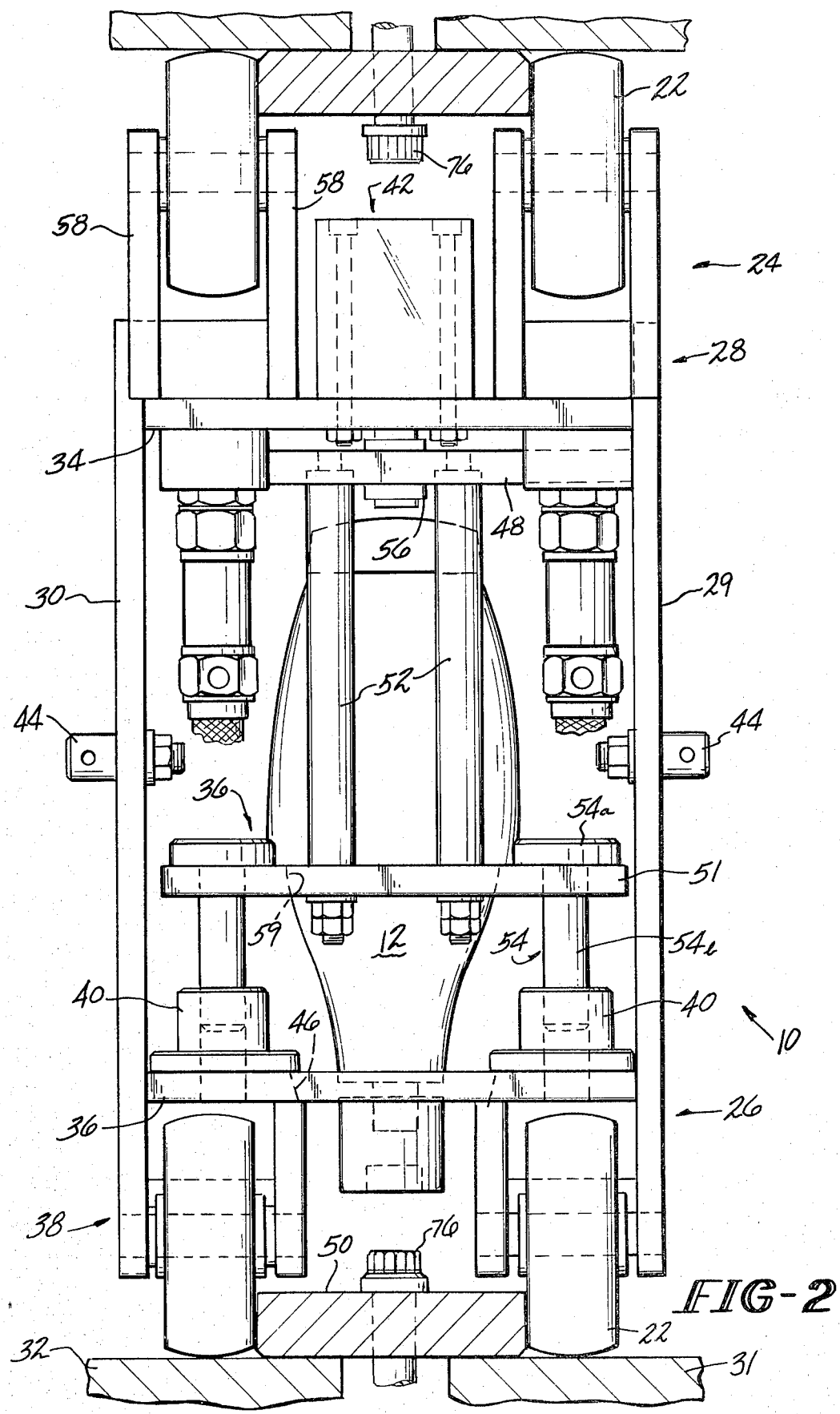
Figure 7:
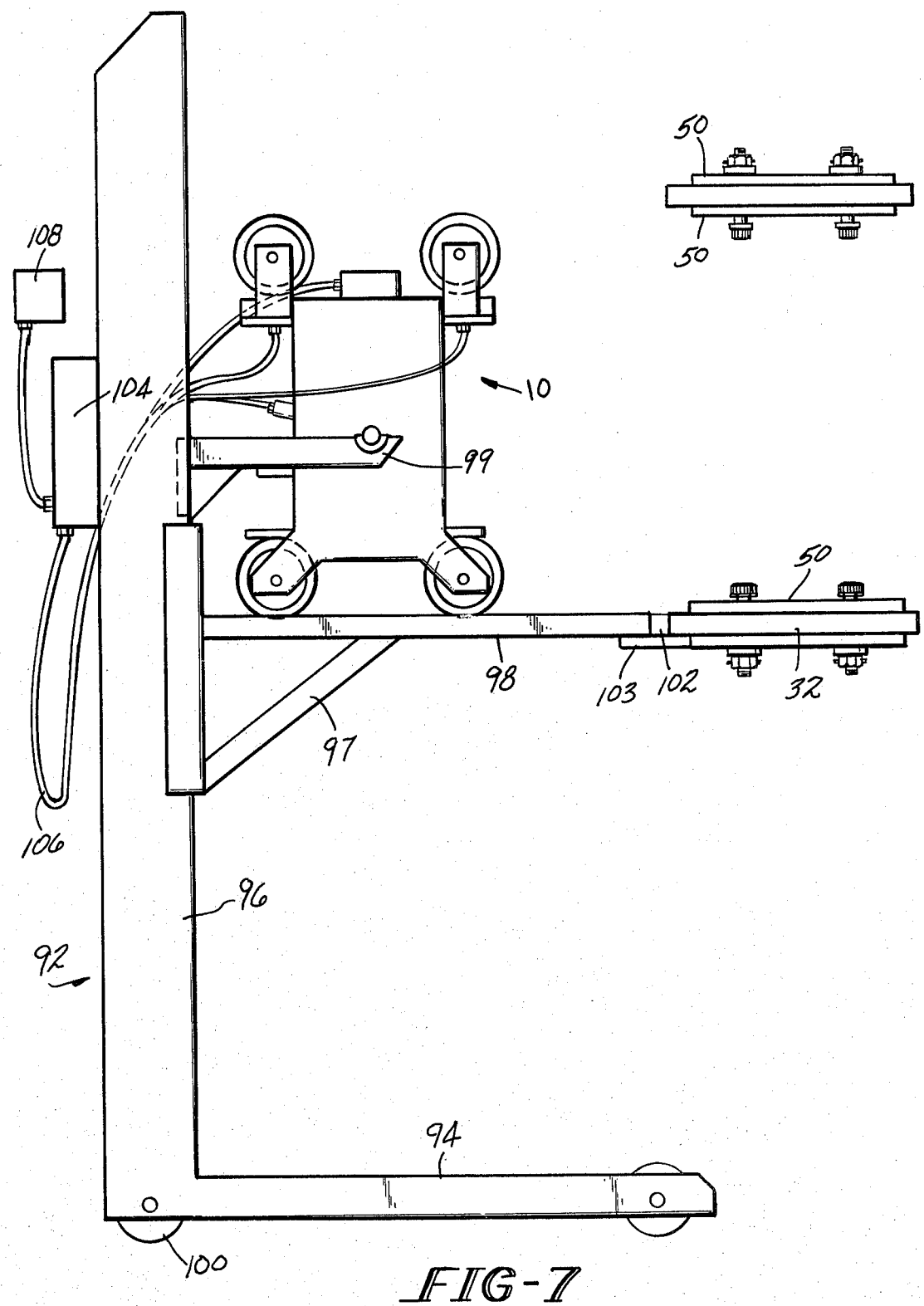

The invention will best be understood by reference to the attached drawing in which:

FIG. 1 is a side-elevational view with portions cut away showing that portion of the invention which is moved between the electrolytic cells, FIG. 2 is a front-elevational view of the portion of FIG. 1 in operable position between electrolytic cells, FIG. 3 is a rear-elevational view of the locator means or "indexing latch" of FIG. 2, FIG. 4 is a horizontal, cross-sectional view looking downward through the bolt-binding, notched foot of the indexing latch of FIG. 3 taken along lines 4—4 of FIG. 1, FIG. 5 is a stepped, horizontal, cross-sectional view looking downward through a portion of the indexing latch of FIGS. 1 and 3 taken along lines 5—5 of FIG. 1, FIG. 6 is a top planar view of a wheel and brake assembly of FIG. 1 taken along lines 6—6 of FIG. 1, and FIG. 7 is a side-elevational view of a dolly and control means which can be used in association with the portion of the invention shown in FIGS. 1-6.

FIG. 1 is a vertical elevational view showing the active "dolly" portion 10 of an apparatus for loosening and tightening an electrical connector between electrolytic cells. FIG. 1 shows portion 10 positioned between two cell terminals 32. Portion 10 is used to tighten and loosen bolts 76. Bolts 76 serve to press an intercell connector 50 into electrical contact with both terminals 32 and another terminal 31 (see FIG. 2). Portion 10 includes a remotely operable tightener means for selectively tightening and loosening the electrical connector 50. One suitable tightener means is an impact wrench 12. It will be understood that bolts 76 could be replaced by conventional screws, Phillips screws, Allen screws or some other type of fastener and that impact wrench 12 would be either modified or replaced by some tightener means suitable for tightening and loosening such fastener means. However, for purposes of illustration, the remainder of the specification will be written on the assumption that a socket-type pneumatic impact wrench is to be utilized as the tightener means. Portion 10 comprises impact wrench 12, a moveable support means 14 for supporting the impact wrench 12 and a locator means 16 for locating wrench 12 at the proper position with respect to bolt 76.

Impact wrench 12 can be a Chicago Pneumatic model No. CP-0606-TESAB ¾ inch capacity, 130-400 foot pound pneumatic impact wrench weighing approximately 3 pounds or any other suitable pneumatic impact wrench. Impact wrench 12 is connected by a pneumatic line 18 to some supply of pressurized air through control means 104 (see FIG. 7).

Support means 14 comprises a framework 20 and 8 wheels 22. Framework 20 includes a fixed section 24 and a moveable section 26. Fixed section 24 is attached to lower wheels 22 directly and to upper wheels 22 indirectly through a wheel adjustment assembly 28. Section 24 comprises two vertical side plates 29 and 30 (see FIG. 2) an upper horizontal cross plate 34, a horizontal cross plate 36, four lower wheel supports 38, four guide sleeves 40 and a wrench lifting assembly 42. One suitable assembly 42 would include an aluminum "Fabco" pancake cylinder with a 3" bore and a 1½" stroke. Wrench lifting assembly 42 serves to raise and lower moveable sections 26 so as to raise and lower impact wrench 12 out of and into engagement with bolt 76. Side plates 29 and 30 each include a lug 44 so that portion 10 can be supported by lug 44 and rotated 180° in order to tighten or loosen upper bolts 76 instead of lower bolts 76.

FIG. 2 is a front elevational view of the portion 10 of FIG. 1 and portion 10 can best be understood by reference to both FIG. 1 and FIG. 2. The referenced numerals in all the FIGURES represent the same parts unless otherwise indicated. Fixed section 24 of framework 20 resembles a box with an open front and back and four wheels 22 on the top of the box and four wheels 22 on the bottom of the box. The vertical sides of this box are formed by side plates 29 and 30 while the top and bottom of the box are formed by upper cross plate 34 and lower cross plate 36, respectively. This box, framework 20, carries moveable section 26 within the box. Moveable section 26 supports impact wrench 12 in such a position that its operative lower end projects downwardly through an opening 46 in lower cross plate 36. Framework 20 also serves to support locator means 16. (see FIG. 1 and FIG. 3) In particular, locator means 16 is mounted on lower cross plate 36 and projects downwardly below cross plate and between lower wheel supports as described below. Other support frameworks could be utilized in place of framework 20 so long as wheels or other movement-allowing guide means were provided for guiding framework 20 in a path along intercell connector 50 so that wrench 12 could be placed in operative position.

Moveable section 26 of framework 20 comprises an upper moveable plate 48 and a lower moveable plate 51, four vertical posts 52, four guide pins 54, and a piston fastener means 56. Assembly 42 of fixed section 24 is mounted atop upper cross plate 34 of framework 20 with the piston of assembly 42 projecting downwardly through cross plate 34 and into engagement with fastener 56. Fastener 56 in turn connects the piston assembly 42 to upper plate 48. Upper plate 48 is connected to lower moveable plate 51 by posts 52. Posts 52 can be bolted or otherwise connected to plate 48 and plate 51 for this purpose. Plate 51 is a rectangular plate with an opening 59 (see FIG. 2) which conforms to the outer surface of impact wrench 12 and allows impact wrench 12 to be positioned vertically with its socket 12a projecting vertically downward through opening 58 as well as opening 46 so that socket 12a can be moved into engagement with bolt 76. Guide pins 54 are vertical cylinders with a disc-shaped head. Pins 54 pass downwardly through openings in lower moveable plate 51 and pass downwardly into guide sleeves 40. Thus, moveable section 26 is limited to vertical movement so that section 26 will not rotate when bolts 76 are tightened or loosened. Pins 54 are provided with a disc-shaped head 54a and a lower cylindrical portion 54b. The lower cylindrical portion 54(b) of pins 54 conforms to the bore of guide sleeves 40. Heads 54(a) can be welded or otherwise connected to plate 51 so that pins 54 are prevented from moving upwardly out of guide sleeves 40. Moveable section 26 thus is vertically moveable within fixed section 24 in response to the application or removal of pressure from assembly 42.

Wheel adjustment assemblies 28, which are attached to upper cross plate 34, each comprise a wheel 22, a pair of vertical wheel support plates 58, a moveable wheel support block 60, a fixed wheel support block 62, a "push" operated air cylinder 64 with a vertical piston shaft 65 and a pair of guide cylinders 66. One piston and cylinder assembly suitable for assembly 64 is a Schrader brass air cylinder with a 1" bore and 1" stroke, push operated. Wheels 22 are rotatably supported on an axle 68 which connects wheel support plates 58. Wheel support plates 58 are in turn attached by a pair of set screws 70 or other fastener means to moveable block 60. Guide cylinders 66 pass vertically from moveable block 60 and into stationary block 62 to make a "floating" connection between blocks 60 and 62. Guide cylinders 66 are pinned by a pin 72 to moveable block 60 but are free to move vertically relative to fixed block 62 so that block 60 is able to move vertically relative to block 62. Block 60 includes a shaft-receiving boss, 60(a) which is adapted to receive the force of piston shaft 65 when pressurized air is supplied to cylinder 64. As air pressure is supplied to cylinder 64, shaft 65 is caused to move vertically upward relative to cylinder 64 whereby shaft 65 contacts boss 60(a) and forces boss 60(a) in block 60 vertically upward. This upward movement in block 60 moves wheels 22 upwardly until it contacts some immoveable object such as cell terminal 32. The force on shaft 65 is thus transferred to wheels 22 and is the pressure which holds upper wheels 22 against the bottom side of upper cell terminal 32. If portion 10 were inverted, as above described, so that impact wrench 12 pointed upwardly instead of downwardly, wheel support assembly 28 would then be located at the bottom of portion 10 and would cause crossplate 34 to move upwardly lifting the remainder of portion 10 except for block 60, plates 58, shaft 68, and the wheels 22 attached to plates 58. Such movement of the remainder of portion 10 would be in the upward direction. Therefore, it would be expected that pressure would be maintained on air cylinder 64 during the entire time that portion 10 was between cell terminals 32. Wheel adjustment means 28 thus serves to expand or contract portion 10 vertically in order that it can fit snugly between two spaced terminals 32. This is especially important when portion 10 is inverted, as otherwise impact wrench 12 might not be able to engage upper bolts 76.

FIGS. 3–6 show particular detail of locator means 16, which serves to locate bolt 76 and stop portion 10 during its travel along the length of electrical connector 50 at a predetermined location such that impact wrench 12 is correctly aligned with one of bolts 76. This predetermined position is a position where impact wrench 12 is directly over such bolt 76 so that when wrench lifting assembly 42 is expanded, socket 12(a) of impact wrench 12 will be moved downwardly over the top of bolt 76 so that then impact wrench 12 is activated to apply torque to socket 12(a), socket 12(a) will apply torque to bolts 76. Without such a bolt locator, it might be quite difficult to remotely operate portion 10 in such a fashion as to stop portion 10 at such a predetermined position. While the locator means described is the preferred one, it will be appreciated that those skilled in the art may make structural modifications to the locator means 16 without departing from the scope of the invention so long as some means is provided for locating bolts 76. Locator means 16 is a preferred feature of the device but the device could be operated albeit more cumbersomely, with a manual locator means (e.g. marks on a pushing stick, etc.). Nevertheless, the remainder of the specification will be described on the assumption that the optional locator means 16 is provided. Locator means 16 comprises a horizontal notched stop plate 74 (see FIGS. 1, 3, and 5), a linkage 75, and a pneumatic, double-acting cylinder and piston assembly 77. One suitable assembly 77 is a double-acting Schrader air cylinder with a 1" and a 1" stroke. Plate 74 cannot slide indefinitely along the upper surface of electrical connector 50 because bolts 76 project upwardly from such surface and plate 74 will contact bolts 76 and stop portion 10 from further movement. Linkage 75 and assembly 77 cooperate to position plate 74 in the proper position to be stopped by bolts 76. After portion 10 is stopped, assembly 42 is activated to move socket 12(a) onto the bolt 76 and wrench 12 is activated to either loosen or tighten bolt 76 as desired. Once the desired loosening or tightening operation is completed, cylinder 77 is expanded so as to cause linkage 75 to lift plate 74 above the tops of bolts 76. Now portion 10 is free to roll beyond bolt 76 and continue its travel along electrical connector 50. As soon as portion 10 moves sufficiently forward to clear bolt 76, assembly 77 is contracted to relower plate 74 against the upper surface of electrical connector 50 so that plate 74 will be stopped by the next bolt 76 in the path of travel. Then, assembly 42 is again activated to lower wrench 12 and wrench 12 is activated to tighten or loosen the next bolt 76 and then assembly 42 is reversed to raise wrench 12 back up again. This process continues until all of the bolts along electrical connector 50 are loosened or tightened, whereby electrical connector can be engaged or disengaged from terminals 32. Linkage 75 comprises a linearly, moveable, vertical, offset-lift link 78, a pair of pin bars 79, a vertically rotatable lift lever link 80, a pair of set screws 81, a fulcrum 82, vertical link bar 83 and a piston clevis 84. Lift link 78 is offset rearwardly at its upper end and forwardly at its lower end to produce a shoulder 78(a) which limits upward movement of lift link 78. Upward movement of link 78 is stopped when shoulder 78(a) comes into contact with the lower side of lower cross-plate 36. Link 78 is also provided with a pair of horizontal slots 78(b) (see FIG. 5) which allow pin bars 79 to slide relative to link 78 so that upward movement of link 78 is not presented by the pins 79(a) of pin bar 79. Set screws 81 rigidly attach pin bar 79 to lever link 80 so that pin bars 79 in cooperation with lever link 80 form a clevis or a yolk about the central portion of lift link 78. Lever link 80 is horizontally fulcrumed on horizontal fulcrum 82 which is attached to the lower surface of horizontal cross-plate 36, whereby lift lever link 80 is allowed to rotate in the vertical plane in response to expansion or contraction of piston and cylinder assembly 77. Lever link 80 is upwardly offset at its rear end so that it is higher than loosened bolts 76 when the rearward end of lever link 80 is lowered (i.e. when plate 74 is raised). The rearward end of lever link 80 has a clevis 80 (a) which is connected to piston clevis 84 by link bar 83. Thus, when assembly 77 is expanded, the rearward end of link 80 is lowered and the forward end of link 80 is raised, thereby raising pin link 79, lift link 78, and stop plate 74. Assembly 77 is attached to lower cross-plate 36 by a bracket 88 which projects beyond the rear end of cross-plate 36 so that assembly 77 can be above the level of cross-plate 36 so that assembly 77 does not interfere with movement of portion 10. In order to further guide the upward movement of lift link 78, a bracket 90 can be added to the bottom of cross-plate 36 adjacent the rear side of slot 86 to prevent lift link 78 from rotating within slot 86 either forwardly or rearwardly.

FIG. 6 is a top view of block 60 and wheel support plates 58 in order to show the location of guide cylinders 66 and boss 60 (a). Guides 66 are preferably placed on opposite sides of block 68 so that block 60 is guided evenly upward and downward in its vertical movements.

FIG. 7 shows a cart 92 which can be used to move the "wrench dolly" (active portion 10) along the aisle adjacent to a series of cells having terminals 31 and 32. FIG. 7 is a side view of cart 92 and from the side, cart 92 appears to have an inverted F-shape. That is, cart 92 comprises a horizontal base member 94, a vertical support member 96, a horizontal shelf member 98, a horizontal pivot arm 99, and 4 wheels 100. Wheels 100 are attached to base members 94. Support member 96 is attached to the rear of the base member 94 and projects upwardly approximately the height of the lower surface of the upper cell terminal 32 with which the active portion 10 is to be contacted. Shelf member 98 is a horizontal plate. Shelf member 98 is attached at its rearward end to vertical support member 92 and projects forwardly in a horizontal plane at the same height as the upper surface of lower cell terminal 32. Shelf member 98 would preferably be provided with an insulative, forward end 102 so that cart 92 could be abutted against the edge of cell terminal 32 in order that portion 10 could be rolled directly from shelf 98 onto terminal 32. Cart 92 would preferably be provided with an alignment device such as engagement member 103 in order that cart 92 could be properly aligned in the lateral direction so that wheels 22 of portion 10 would straddle connector 50 when portion 10 is rolled off of cart 92 and onto terminal 32. Cart 92 also carries the control panel 104 which includes the pneumatic switches for controlling the actuation of assemblies 42, 64, and 77 and to impact wrench 12 by which the loosening and tightening operations are remotely controlled. Pneumatic lines 106 run between control panels 104 and the various pneumatic wrench and piston and cylinder assemblies of portion 10. Control panel 104 would also be connected by a suitable pneumatic line to a regulated source of pressurized air 108.

With the above structure in mind, it is readily apparent how the apparatus is operated. Cart 92 is moved into position between two cells to be disconnected and is aligned with cell terminals 32 and 31 in a lateral position such that wheels 22 will straddle electrical connectors 50 when portion 10 is rolled off of cart 92 and onto cell terminals 32. Portion 10 is then rolled along connector 50 until stop plate 74 strikes the first bolt 76 closest to the end of connector 50 from which portion 10 was inserted. At this point assembly 64 and 42 are activated so that portion 10 is expanded into engagement with both upper and lower cell terminals 32 and impact wrench 12 is lowered into engagement with bolt 76. Impact wrench 12 is then activated to tighten or loosen bolt 76 and then assembly 42 is again activated to raise impact wrench 12 out of operative position. Following the raising of impact wrench 12, assembly 77 is activated to raise stop plate 74 so that it clears the loosened bolt 76. Portion 10 is now moved beyond the first bolt 76 and assembly 77 is again activated to lower plate 74 against the top of connectors 50. Portion 10 is then moved forward until plate 70 strikes the next bolt 76 and assembly 42 is then again activated to relower wrench 12 into operative position. This process is repeated until all bolts of connector 50 are either loosened or tightened, as the case may be. Portion 10 is then pulled back onto cart 92 and lugs 44 are placed into pivot arm 99 and portion 10 is rotated 180° so that impact wrench 12 now faces upwardly and then the operations are again repeated for example, this time working from the far end of the upper cell connector 50 toward cart 92. When the operation is complete, portion 10 is put back onto cart 92 and wheeled to the next location to be disconnected. In this way the tightening and loosening of intercell connectors can be accomplished remotely without the need for operators to manually enter the space between cells and manually disconnect bolts 76 and reconnect bolts 76.

While active portion 10 is shown straddling connector 50, with wheels 22 rolling on terminals 31 and 32, portion 10 could ride on flanges (not shown) attached to connector 50. This would be desirable where connector 50 was very high, in order to reduce the size of portion 10 and hence reduce the weight of portion 10 to make portion 10 easier to manipulate.

Although the invention has been described in terms of a single preferred embodiment, many other embodiments will suggest themselves to one of ordinary skill in the art and the following claims should be interpreted to cover the broad range of equivalence to which they are entitled.

What is claimed is:

1. Apparatus for remotely loosening and tightening upper and lower electrical connectors between electrolytic cells, which apparatus comprises:
   (a) remotely operable tightener means for selectively tightening and loosening said electrical connectors, means for moving said tightener means along a generally vertical path to selectively engage an upper or lower of said electrical connectors;
   (b) means for inverting said movable support means thereby inverting said tightener means;
   (c) moveable support means for supporting said tightener means and for moving said tightener means along a generally horizontal path to align said tightener means with said upper or lower electrical connectors along said generally vertical path before said tightener means is moved along said generally vertical path to engage said electrical connectors for loosening or tightening;
   (d) guide means fastened to said movable support means and contactable with said electrical connectors for guiding said support means along a predetermined path of travel between said cells, said path including at least one predetermined location at which said tightener means is operable to loosen and tighten said electrical connector;
   (e) locator means connected to said movable support means for locating said support means at said predetermined location along said path; and
   (f) control means connected to said movable support means for remotely controlling the operation of said tightener means when said tightener means is located at said predetermined location, whereby said electrical connector is selectively and remotely tightened and loosened.

2. The apparatus of claim 1 wherein said moveable support means further includes at least a first section and a second section and expanding means connecting said first and second sections, whereby said moveable support means can be expanded so that said first section moves in a direction away from said second section along said generally vertical path to permit said tightener means to selectively engage said electrical connector.

3. The apparatus of claim 1 wherein said guide means comprises at least one pair of wheels, said pair of wheels being spaced apart approximately the same distance as the width of the electrical connector, whereby said wheels are adapted to guide said support means along said electrical connector.

4. The apparatus of claim 1 wherein said electrical connector is fastened between said cells by fastener means and said locator means is a fastener locator means for locating said support means at a predetermined position relative to said fastener means, such location being a location where said remotely operable tightener means is operable to loosen and tighten said fastener means.

5. The apparatus of claim 4 wherein said locator means includes a horizontal stop plate means for stopping movement of said moveable support means when said stop plate contacts said fastener means.

6. The apparatus of claim 5 wherein said locator means further comprises means for vertically moving said stop plate so as to allow passage of said moveable support means past said fastener means.

7. The apparatus of claim 1 wherein said moveable support means includes means for vertically moving said tightener means into and out of engagement with fastener means on said electrical connector.

8. The apparatus of claim 7 wherein said means for moving said tightener means is a double-acting, remotely-controlled, pneumatic cylinder.

9. The apparatus of claim 8 wherein said tightener means is a remote controlled, pneumatic impact wrench.

10. The apparatus of claim 9 wherein said moveable support means includes pneumatic means for vertically expanding and contracting said moveable support means.

11. The apparatus of claim 10 wherein said guide means includes at least one pair of spaced wheels, said pair of wheels being spaced apart by a distance slightly greater than the width of said electrical connector and adapted to rotate along opposite lateral sides of said electrical connector.

12. The apparatus of claim 11 wherein said moveable support means includes an expandable wheel support assembly means for moving at least one wheel vertically relative to said moveable support means.

13. The apparatus of claim 1 wherein said guide means includes a pair of spaced wheels and said locator means includes a stop plate positioned between said wheels.

14. The apparatus of claim 13 wherein said wheels are spaced apart by a width slightly greater than the width of said electrical connector and said stop plate is positioned above the height of the bottom of said pair of guide wheels by a distance slightly greater than the height of said electrical connector, whereby when the bottom of said pair of wheels is even with the level of the bottom of connector 50 and said pair of wheels straddles connector 50, then said stop plate rests atop connector 50.

* * * * *